United States Patent
Kang

(10) Patent No.: US 11,853,202 B2
(45) Date of Patent: Dec. 26, 2023

(54) MEMORY SYSTEM PERFORMING GARBAGE COLLECTION OPERATION BY EXCHANGING INFORMATION RELATED TO GARBAGE COLLECTION WITH HOST AND METHOD OF OPERATING THE MEMORY SYSTEM

(71) Applicant: SK hynix Inc., Icheon (KR)

(72) Inventor: Hye Mi Kang, Icheon (KR)

(73) Assignee: SK hynix Inc., Icheon (KR)

( * ) Notice: Subject to any disclaimer, the term of this patent is extended or adjusted under 35 U.S.C. 154(b) by 9 days.

(21) Appl. No.: 17/307,868

(22) Filed: May 4, 2021

(65) Prior Publication Data

US 2022/0138099 A1 May 5, 2022

(30) Foreign Application Priority Data

Nov. 2, 2020 (KR) ........................ 10-2020-0144626

(51) Int. Cl.
*G06F 12/02* (2006.01)
*G06F 12/0891* (2016.01)

(52) U.S. Cl.
CPC ...... *G06F 12/0253* (2013.01); *G06F 12/0246* (2013.01); *G06F 12/0891* (2013.01); *G06F 2212/7201* (2013.01)

(58) Field of Classification Search
CPC ............. G06F 12/0253; G06F 12/0246; G06F 12/0891; G06F 2212/7201
See application file for complete search history.

(56) References Cited

U.S. PATENT DOCUMENTS

| | | | |
|---|---|---|---|
| 11,100,006 B1 * | 8/2021 | Lercari | ............... G06F 12/1009 |
| 2007/0113029 A1 * | 5/2007 | Bennett | ............... G06F 12/0246 |
| | | | 711/159 |
| 2007/0143560 A1 * | 6/2007 | Gorobets | ............... G11C 16/10 |
| | | | 711/170 |

(Continued)

FOREIGN PATENT DOCUMENTS

| | | |
|---|---|---|
| JP | 2016170583 A | 9/2016 |
| KR | 20090116505 A | 11/2009 |

OTHER PUBLICATIONS

"[Curious Semiconductor WHY] What is the difference between ZNS SSD and existing SSD?", Apr. 18, 2019, https://news.skhynix.co.kr/1915.

*Primary Examiner* — Tasnima Matin

(57) ABSTRACT

An electronic device includes a memory system having improved performance. The memory system includes a memory device including memory blocks allocated to zones, a memory controller configured to send, to a host, a request for information on whether to perform a garbage collection operation on a target zone according to a trigger signal for performing a first internal operation, the target zone corresponding to a target memory block on which the first internal operation is to be performed, the target zone being included in the zones, and the host configured to provide the information on whether to perform the garbage collection operation to the memory controller based on information related to the zones, in response to the request. The memory controller determines whether to perform the first internal operation on the target memory block, based on the information on whether to perform the garbage collection operation.

11 Claims, 17 Drawing Sheets

(56) References Cited

U.S. PATENT DOCUMENTS

| | | | | |
|---|---|---|---|---|
| 2016/0118132 A1* | 4/2016 | Prins | ............... | G06F 11/076 |
| | | | | 714/704 |
| 2016/0232088 A1* | 8/2016 | Mohan | ............... | G06F 12/0246 |
| 2017/0371559 A1* | 12/2017 | Higgins | ............... | G06F 3/0673 |
| 2018/0373629 A1* | 12/2018 | Kim | ............... | G06F 3/0632 |
| 2019/0108136 A1* | 4/2019 | Park | ............... | G06F 12/0871 |
| 2020/0034287 A1* | 1/2020 | Hashimoto | ............... | G06F 3/0643 |

\* cited by examiner

MEMORY SYSTEM PERFORMING GARBAGE COLLECTION OPERATION BY EXCHANGING INFORMATION RELATED TO GARBAGE COLLECTION WITH HOST AND METHOD OF OPERATING THE MEMORY SYSTEM

CROSS-REFERENCE TO RELATED APPLICATION

The present application claims priority under 35 U.S.C. § 119(a) to Korean patent application number 10-2020-0144626, filed on Nov. 2, 2020, in the Korean Intellectual Property Office, the entire disclosure of which is incorporated herein by reference.

BACKGROUND

1. Technical Field

The present disclosure relates to an electronic device, and more particularly, to a memory system and a method of operating the same.

2. Related Art

A storage device is a device that stores data under the control of a host device such as a computer or a smartphone. The storage device may include a memory device storing data and a memory controller controlling the memory device. The memory device may be classified into a volatile memory device and a nonvolatile memory device.

The volatile memory device may be a device that stores data only when power is supplied thereto and loses stored data when the power supply is cut off. The volatile memory device may include a static random access memory (SRAM), a dynamic random access memory (DRAM), and the like.

The nonvolatile memory device is a device that does not lose data even though power is cut off. The nonvolatile memory device may include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a memory system having improved performance and a method of operating the same.

According to an embodiment of the present disclosure, a memory system includes a memory device including a plurality of memory blocks allocated to a plurality of zones, a memory controller configured to send, to a host, a request for information on whether to perform a garbage collection operation on a target zone according to a trigger signal for performing a first internal operation, the target zone corresponding to a target memory block on which the first internal operation is to be performed, the target zone being included in the plurality of zones, and the host configured to provide the information on whether to perform the garbage collection operation to the memory controller based on information related to the plurality of zones, in response to the request. The memory controller determines whether to perform the first internal operation on the target memory block, based on the information on whether to perform the garbage collection operation.

According to an embodiment of the present disclosure, a method of operating a memory system includes generating, by a memory controller of the memory system, a trigger signal for performing a first internal operation, sending, by the memory controller, a request for information on whether to perform a garbage collection operation on a target zone according to the trigger signal, to a host of the memory system, the target zone corresponding to a target memory block on which the first internal operation is to be performed, the target zone being included in a plurality of zones, providing, by the host, the information on whether to perform the garbage collection operation to the memory controller based on information related to the plurality of zones, which is stored in the host, and determining, by the memory controller, whether to perform the first internal operation, based on the information on whether to perform the garbage collection operation.

According to an embodiment of the present disclosure, a memory controller that controls a memory device including a plurality of memory blocks allocated to a plurality of zones includes a host controller configured to send, to a host, a request for information on whether to perform a garbage collection operation on a target zone according to a trigger signal for performing a first internal operation, the target zone corresponding to a target memory block on which the first internal operation is to be performed, the target zone being included in the plurality of zones, and receive, from the host, the information on whether to perform the garbage collection operation, and a memory device controller configured to control the memory device to perform one of the first internal operation and a second internal operation corresponding to the garbage collection operation on the target zone controlled by the host, based on the information on whether to perform the garbage collection operation.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and are not limited to the embodiments described in the present specification or application.

Figure 1:
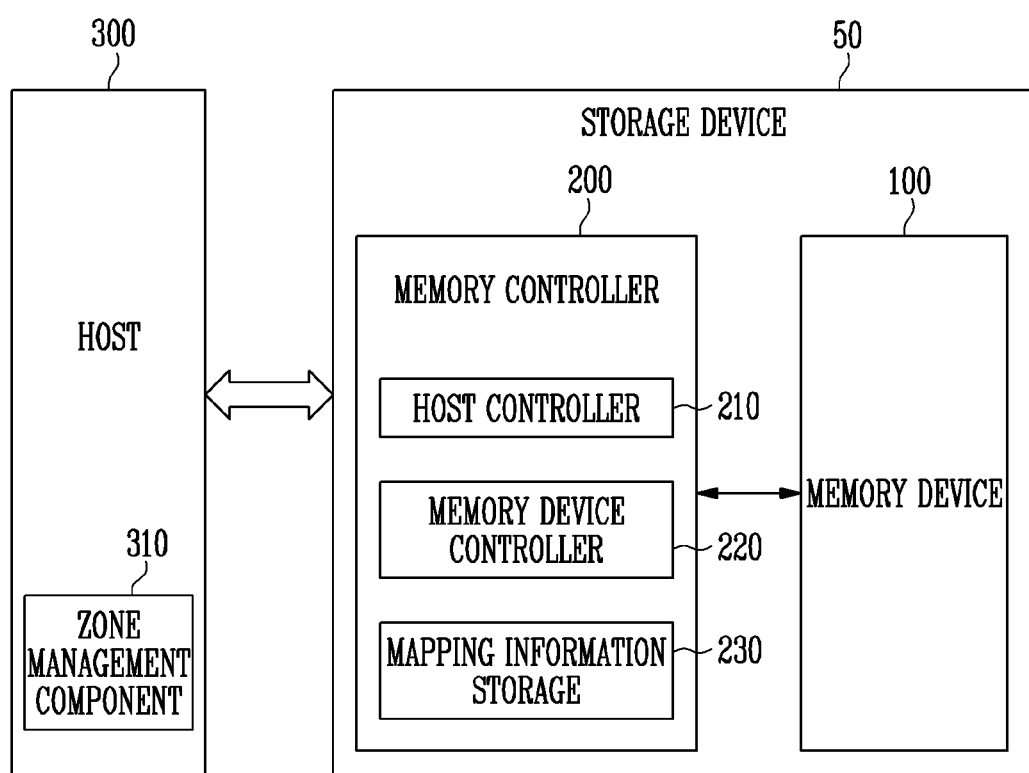
FIG. 1 is a diagram illustrating a memory system according to an embodiment of the present disclosure.

FIG. 1 is a diagram illustrating a memory system 10 according to an embodiment of the present disclosure.

Referring to FIG. 1, the memory system 10 may include a storage device 50 and a host 300.

The storage device 50 may include a memory device 100 and a memory controller 200 that controls an operation of the memory device 100. The storage device 50 may store data under the control of the host 300 such as a cellular phone, a smartphone, an MP3 player, a laptop computer, a desktop computer, a game player, a TV, a tablet PC, an in-vehicle infotainment system, or the like.

The storage device 50 may be manufactured as one of various types of storage devices according to a host interface that is a communication method with the host 300. For example, the storage device 50 may be configured as any one of various types of storage devices including an SSD, a multimedia card such as an MMC, an eMMC, an RS-MMC, or a micro-MMC, a secure digital card such as an SD, a mini-SD, or a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, a memory stick, and so on.

The storage device 50 may be manufactured as any one of various types of packages such as a package on package (POP), a system in package (SIP), a system on chip (SOC), a multi-chip package (MCP), a chip on board (COB), a wafer-level fabricated package (WFP), a wafer-level stack package (WSP), and so on.

The memory device 100 may store data. The memory device 100 operates under the control of the memory controller 200. The memory device 100 may include a memory cell array (not shown) including a plurality of memory cells that store data.

Each of the memory cells may be configured as a single level cell (SLC) that stores one-bit data, a multi-level cell (MLC) that stores two-bit data, a triple level cell (TLC) that stores three-bit data, or a quad level cell (QLC) capable of storing four-bit data The memory cell array (not shown) may include a plurality of memory blocks. One memory block may include a plurality of pages. In an embodiment, a page may be a unit for storing data in the memory device 100 or reading data stored in the memory device 100. A memory block may be a unit for erasing data stored in the memory device 100.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, it is assumed that the memory device 100 is a NAND flash memory.

The memory device 100 is configured to receive a command CMD and an address ADDR from the memory controller 200 and access an area selected by the address ADDR in the memory cell array. The memory device 100 may perform an operation instructed by the command CMD on the area selected by the address ADDR. For example, the memory device 100 may perform a write operation (or program operation), a read operation, and an erase operation. During the program operation, the memory device 100 may program data to the area selected by the address ADDR. During the read operation, the memory device 100 may read data from the area selected by the address ADDR. During the erase operation, the memory device 100 may erase data stored in the area selected by the address ADDR.

In an embodiment, the memory device 100 may include a plurality of memory blocks allocated to a plurality of zones. A concept of the zone will be described in detail with reference to FIG. 4.

The memory controller 200 may control an overall operation of the storage device 50.

When power is applied to the storage device 50, the memory controller 200 may execute firmware (FW). When the memory device 100 is a flash memory device, the firmware (FW) may include a host interface layer (HIL) that controls communication with the host 300. The firmware (FW) may further include a flash translation layer (FTL) that controls communication between the host 300 and the memory device 100, and a flash interface layer (FIL) that controls communication with the memory device 100.

In an embodiment, the memory controller 200 may receive data and a logical block address (LBA) from the host 300 and may translate the LBA into a physical block address (PBA) indicating an address of memory cells in which the data is to be stored in the memory device 100. In the present specification, the LBA and a "logic address" or a "logical address" may be used as having the same meaning. In the present specification, the PBA and a "physical address" may be used as having the same meaning.

The memory controller 200 may control the memory device 100 to perform the program operation, the read operation, the erase operation, or the like according to a request of the host 300. During the program operation, the memory controller 200 may provide a write command, a PBA, and data to the memory device 100. During the read operation, the memory controller 200 may provide a read command and a PBA to the memory device 100. During the erase operation, the memory controller 200 may provide an erase command and a PBA to the memory device 100.

In an embodiment, the memory controller 200 may generate a command, an address, and data regardless of the request from the host 300 and transmit the command, the address, and the data to the memory device 100. For example, the memory controller 200 may provide the memory device 100 with the command, the address, and the data for performing a read operation and program operations accompanying in performing wear leveling, read reclaim, garbage collection, and the like.

In an embodiment, the memory controller 200 may control two or more memory devices 100. In this case, the memory controller 200 may control the memory devices 100 according to an interleaving method to improve operation performance. The interleaving method may be a method of controlling operations for the two or more memory devices 100 to overlap with each other.

In an embodiment, the memory controller 200 may include a host controller 210, a memory device controller 220, and a mapping information storage 230.

The host controller 210 may receive a request for a program operation, a read operation, an erase operation, or the like from the host 300.

In addition, the host controller 210 may send, to the host 300, a request for information on whether to perform garbage collection for a target zone including a memory block on which a first internal operation is to be performed. At this time, the first internal operation may include a wear leveling operation, a read reclaim operation, or the like. The host controller 210 may receive the information on whether to perform the garbage collection for the target zone from the host 300 in response to the request. Thereafter, the host controller 210 may provide the information on whether to perform the garbage collection for the target zone to the memory device controller 220.

The memory device controller 220 may provide commands for controlling the memory device 100 to the memory device 100.

In addition, the memory device controller 220 may obtain information on the target zone including the memory block on which the first internal operation is to be performed from the mapping information storage 230 according to a trigger signal for performing the first internal operation. The memory device controller 220 may provide the information on the target zone to the host controller 210 so that the host controller 210 sends the request to the host 300 based on the information on the target zone. Thereafter, the memory device controller 220 may receive the information on whether to perform the garbage collection for the target zone from the host controller 210. The memory device controller 220 may control the memory device 100 to perform one of the first internal operation and a second internal operation based on the information on whether to perform the garbage collection for the target zone.

In an embodiment, the second internal operation may be an internal operation corresponding to the garbage collection operation controlled by the host 300. For example, the second internal operation may include a read operation, a program operation, and an erase operation for the garbage collection operation. In an embodiment, the garbage collection operation controlled by the host 300 may be an operation of storing valid data, which is included in a target zone, in another zone and resetting the target zone. In this case, the second internal operation may include a read operation and a program operation for storing the valid data, which is included in the target zone, in the other zone, and may include an erase operation for resetting the target zone.

The mapping information storage 230 may store mapping information indicating a mapping relationship between a plurality of zones and a plurality of memory blocks. When the mapping relationship between the plurality of zones and the plurality of memory blocks is changed according to a result of the first internal operation or the second internal operation performed in the memory device 100, the mapping information storage 230 may update the mapping information.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), a load reduced DIMM (LRDIMM), and so on.

The host 300 may request a program operation, a read operation, an erase operation, or the like to the storage device 50. The host 300 may transmit a host command, data, and a logical address corresponding to a program request to the memory controller 200 to perform the program operation on the memory device 100. In addition, the host 300 may transmit a host command and a logical address corresponding to a read request to the memory controller 200 to perform the read operation on the memory device 100.

In an embodiment, the host 300 may include a zone management component 310.

The zone management component 310 may manage information related to the plurality of zones. At this time, the information related to the plurality of zones may include identification information of each of the plurality of zones, state information of each of the plurality of zones, information on whether invalid data is included in each of the plurality of zones, information on whether garbage collection is required for each of the plurality of zones, and the like.

In addition, the zone management component 310 may receive, from the host controller 210, a request for information on whether to perform the garbage collection for the target zone. In response to the request, the zone management component 310 may provide the information on whether to perform the garbage collection for the target zone to the host controller 210 based on the information related to the plurality of zones. For example, the zone management component 310 may provide the host controller 210 with one of garbage collection (GC) performing information indicating that the garbage collection operation for the target zone is to be performed and GC unperformed information indicating that the garbage collection operation for the target zone is not to be performed.

In an embodiment, the zone management component 310 may control the garbage collection operation for the target zone. For example, the zone management component 310 may provide an operation request for the memory device 100 to perform the second internal operation to the host controller 210 in order to control the garbage collection operation.

Figure 2:
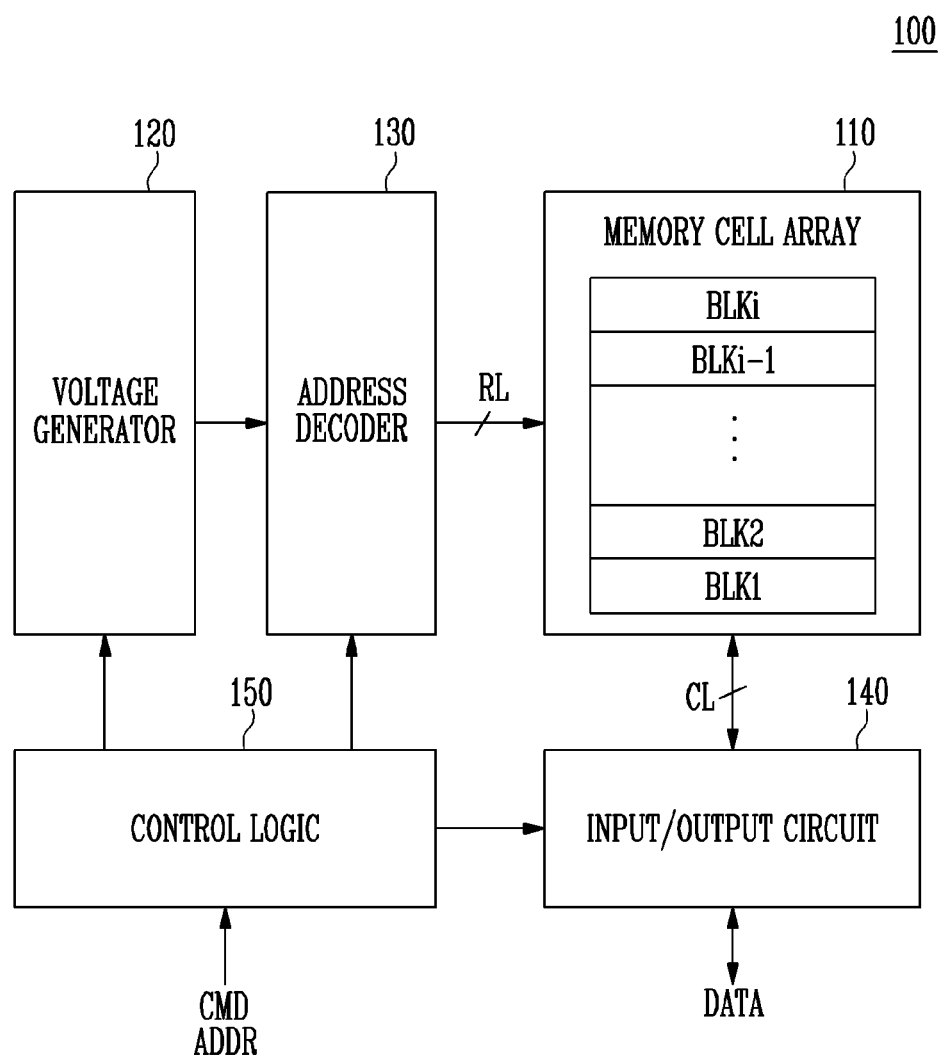
FIG. 2 is a diagram illustrating a memory device of FIG. 1.

FIG. 2 is a diagram illustrating the memory device 100 of FIG. 1.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi, i being a positive integer. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. Therefore, the memory cell array 110 may include a plurality of physical pages. Each of the memory cells of the memory device 100 may be configured as an SLC that stores one-bit data, an MLC that stores two-bit data, a TLC that stores three-bit data, or a QLC capable of storing four-bit data.

In an embodiment, the voltage generator 120, the address decoder 130, and the input/output circuit 140 may be collectively referred to as a peripheral circuit. The peripheral circuit may drive the memory cell array 110 under the control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates under the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using the external power voltage or the internal power voltage. The voltage generator 120 may be configured to generate various voltages required in the memory device 100. For example, the voltage generator 120 may generate a plurality of erase voltages, a plurality of program voltages, a plurality of program pass voltages, a plurality of read voltages, a plurality of read pass voltages, and so on.

The voltage generator 120 may include a plurality of pumping capacitors that receive the internal power voltage to generate the plurality of operation voltages having various voltage levels, and may generate the plurality of operation voltages by selectively activating the plurality of pumping capacitors under the control of the control logic 150.

The plurality of operation voltages may be supplied to the memory cell array 110 by the address decoder 130.

The address decoder 130 is connected to the memory cell array 110 through the row lines RL. The address decoder 130 is configured to operate under the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of the selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

According to an embodiment of the present disclosure, during the read operation, the address decoder 130 may apply a read voltage to the selected word line and apply a read pass voltage to unselected word lines. The read pass voltage may have a level higher than that of the read voltage.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data temporarily stored in the plurality of page buffers may be stored in selected memory cells.

During the read operation, data stored in the selected memory cells may be sensed through the bit lines, and the sensed data may be temporarily stored in the plurality of page buffers.

The control logic 150 may control the address decoder 130, the voltage generator 120, and the input/output circuit 140. The control logic 150 may operate in response to a command CMD transmitted from an external device. The control logic 150 may generate various signals in response to the command CMD and the address ADDR to control the peripheral circuit.

Figure 3:
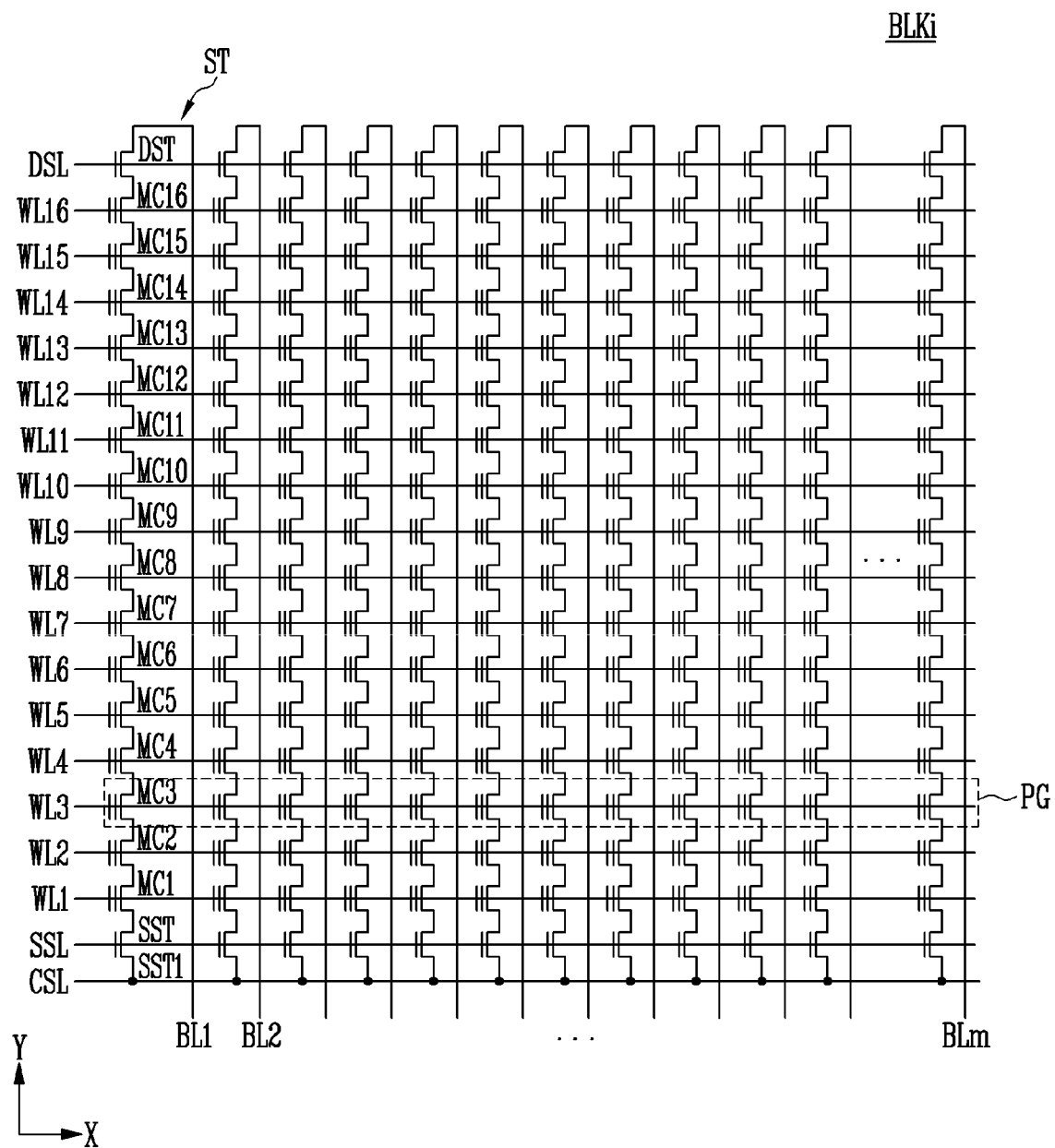
FIG. 3 is a diagram illustrating any one of memory blocks of FIG. 2.

FIG. 3 is a diagram illustrating a memory block BLKi.

The memory block BLKi of FIG. 3 corresponds to any one of the memory blocks BLK1 to BLKi of FIG. 2.

Referring to FIG. 3, a plurality of word lines arranged in parallel with each other may be disposed between a first select line and a second select line. Here, the first select line may be a source select line SSL, and the second select line may be a drain select line DSL. More specifically, the memory block BLKi may include a plurality of strings ST connected between bit lines BL1 to BLm and a common source line CSL. The bit lines BL1 to BLm may be connected to the strings ST, respectively, and the common source line CSL may be commonly connected to the strings ST. Since the strings ST may be configured to be identical to each other, a string ST connected to the first bit line BL1 is specifically described as an example.

The string ST may include a source select transistor SST, a plurality of memory cells MC1 to MC16, and a drain select transistor DST connected in series between the common source line CSL and the first bit line BL1. One string ST may include at least one source select transistor SST and at least one drain select transistor DST, and may include memory cells less or more than the number of memory cells MC1 to MC16 shown in FIG. 3.

A source of the source select transistor SST may be connected to the common source line CSL and a drain of the drain select transistor DST may be connected to the first bit line BL1. The memory cells MC1 to MC16 may be connected in series between the source select transistor SST and the drain select transistor DST. Gates of the source select transistors SST included in the strings ST may be connected to the source select line SSL, gates of the drain select transistors DST included in the strings ST may be connected to the drain select line DSL, and gates of the memory cells MC1 to MC16 included in the strings ST may be respectively connected to the plurality of word lines WL1 to WL16. A group of memory cells connected to the same word line among the memory cells included in the strings ST may be referred to as a page PG. Therefore, the memory block BLKi may include a plurality of physical pages PG corresponding to the number of the word lines WL1 to WL16.

One memory cell may store one bit of data. This is commonly called a single level cell (SLC). In this case, one physical page PG may store one logical page (LPG) data. The one logical page (LPG) data may include data bits of the same number as cells included in one physical page PG.

When one memory cell stores two or more bits of data, one physical page PG may store two or more logical page (LPG) data. In this case, the one physical page PG corresponds to two or more logical pages.

Figure 4:
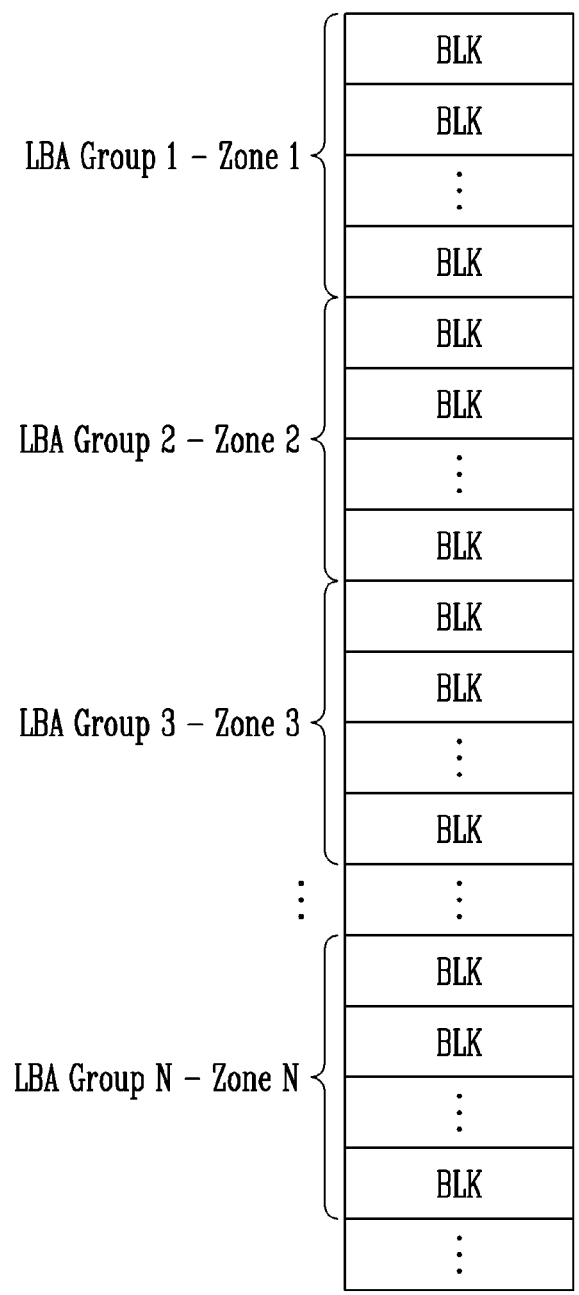
FIG. 4 is a diagram illustrating a concept of a zone according to an embodiment.

FIG. 4 is a diagram illustrating a concept of a zone according to an embodiment.

In FIG. 4, a plurality of zones may include a first zone Zone 1 to an N-th zone Zone N. Each of the plurality of zones may include a plurality of memory blocks. In an embodiment, the number of memory blocks included in each of the plurality of zones may be different from each other or may be the same. A zone may correspond to an area that stores data corresponding to logical addresses input from the host 300 of FIG. 1. Specifically, the plurality of zones may correspond to areas that store data corresponding to logical address groups, respectively. For example, the first zone Zone 1 may correspond to an area that stores data corresponding to a first memory block group (first logical address group) LBA Group 1. The second zone Zone 2 may correspond to an area that stores data corresponding to a second memory block group (second logical address group) LBA Group 2. The third zone Zone 3 may correspond to an area that stores data corresponding to a third memory block group (third logical address group) LBA Group 3. The N-th zone Zone N may correspond to an area that stores data corresponding to an N-th memory block group LBA (N-th logical address group) Group N. At this time, each of the logical address groups may include a plurality of successive logical addresses.

Meanwhile, each of the plurality of zones may have an open state or a closed state according to a request of the host 300. At this time, a zone having the open state may be referred to as an open zone, and a zone having the closed state may be referred to as a closed zone. The open zone means a zone where data can be written, that is, a writable zone. The memory controller 200 of FIG. 1 may perform a write operation for writing data in the open zone. The closed zone means a zone where data cannot be written. The memory controller 200 may not perform the write operation for writing data in the closed zone until the closed zone is changed to the open zone.

For example, in response to an open zone request provided by the host 300, the memory controller 200 may open a zone. Here, opening the zone may mean generating a map table for a logical address group corresponding to the zone.

In response to a closed zone request provided by the host 300, the memory controller 200 may change a state of a corresponding zone to the closed state. The closed zone request may be a request indicating that a write request is not to be executed on the corresponding zone until the open zone request for the corresponding zone is input.

In addition, each of the plurality of zones may perform a reset operation according to a reset request input from the host 300. At this time, the reset operation may be an operation of erasing data stored in memory blocks included in a corresponding zone that is a target of the reset request. For example, when a reset request for the first zone Zone 1 is input, the memory device 100 of FIG. 1 may perform an erase operation on memory blocks included in the first zone Zone 1. When a reset request for the second zone Zone 2 is input, the memory device 100 may perform an erase operation on memory blocks included in the second zone Zone 2. When a reset request for the third zone Zone 3 is input, the memory device 100 may perform an erase operation on memory blocks included in the third zone Zone 3. When a reset request for the N-th zone Zone N is input, the memory device 100 may perform an erase operation on memory blocks included in the N-th zone Zone N.

Meanwhile, in the memory system 10 of FIG. 1, the host 300 may control the garbage collection operation to be performed on the zones. In addition, the storage device 50 of the memory system 10 may control an operation of moving data stored in a specific memory block to another memory block, such as a wear leveling operation or a read reclaim operation. At this time, when the garbage collection operation is performed on the specific memory block after the wear leveling operation or the read reclaim operation on the specific memory block is performed, the memory system 10 performs the operation of moving data from the specific memory block to another memory block twice. Accordingly, the memory system 10 has a problem that performance is deteriorated due to a redundant operation.

Therefore, according to embodiments, the performance of the memory system 10 may be improved by checking whether to perform the garbage collection for a target zone through communication between the host 300 and the storage device 50 and determining whether to perform an internal operation on memory blocks included in the target zone based on a checking result.

Figure 5:
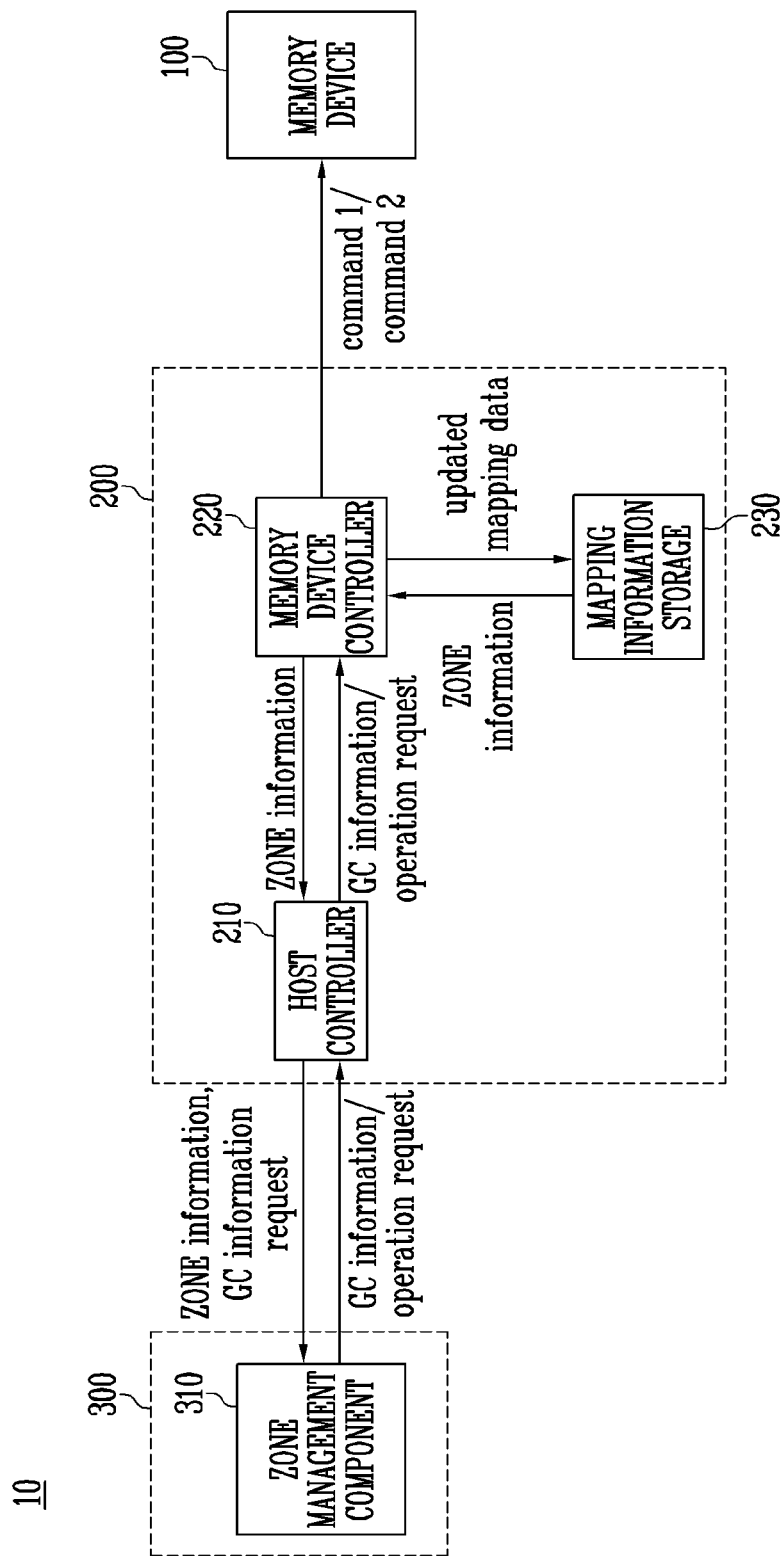
FIG. 5 is a diagram illustrating an operation of a memory system according to an embodiment of the present disclosure.

FIG. 5 is a diagram illustrating an operation of a memory system according to an embodiment of the present disclosure.

A host controller 210, a memory device controller 220, a mapping information storage 230, and a zone management component 310 shown in FIG. 5 may correspond to the host controller 210, the memory device controller 220, the mapping information storage 230, and the zone management component 310 shown in FIG. 1, respectively.

Referring to FIG. 5, in an embodiment, the host controller 210 may send a GC information request for information on whether to perform the garbage collection for a target zone including a specific memory block on which a first internal operation is to be performed among a plurality of zones, to the zone management component 310.

For example, according to a trigger signal for performing the first internal operation, the host controller 210 may obtain ZONE information, that is, zone information, for the target zone from the memory device controller 220. Thereafter, the host controller 210 may provide the ZONE information and the GC information request to the zone management component 310.

The host controller 210 may receive GC information on whether to perform the garbage collection for the target zone from the zone management component 310. At this time, in an embodiment, the GC information on whether to perform the garbage collection may include one of GC performing information indicating that a garbage collection operation is to be performed on the target zone and GC unperformed information indicating that the garbage collection operation is not to be performed on the target zone.

The host controller 210 may provide the GC information on whether to perform the garbage collection to the memory device controller 220. For example, the host controller 210 may provide the memory device controller 220 with one of the GC performing information and the GC unperformed information.

The host controller 210 may receive a GC request for the target zone from the zone management component 310. For example, the host controller 210 may receive an operation request for the garbage collection operation after receiving the GC performing information from the zone management component 310. Thereafter, the host controller 210 may provide the operation request to the memory device controller 220.

The memory device controller 220 may obtain the ZONE information corresponding to the specific memory block on which the first internal operation is to be performed from the mapping information storage 230 according to the trigger signal for performing the first internal operation. At this time, the trigger signal may be a signal generated when it is determined that the wear leveling operation or the read reclaim operation is required for the specific memory block. In response to the trigger signal, the memory device controller 220 may request the ZONE information corresponding to the specific memory block on which the first internal operation, i.e., the wear leveling operation or the read reclaim operation, is to be performed from the mapping information storage 230. Thereafter, the memory device controller 220 may receive the ZONE information from the mapping information storage 230.

The memory device controller 220 may provide the ZONE information to the host controller 210. Thereafter, the memory device controller 220 may receive the GC information on whether to perform the garbage collection for the target zone from the host controller 210.

The memory device controller 220 may control the memory device 100 to perform one of the first internal operation and the second internal operation based on the GC information on whether to perform the garbage collection.

Specifically, the memory device controller 220 may determine whether to perform the first internal operation based on the GC information.

When the GC unperformed information is received from the host controller 210 as the GC information, the memory device controller 220 may provide a command 1 for performing the first internal operation to the memory device 100. For example, when the first internal operation is the wear leveling operation, the memory device controller 220 may provide a command for performing the wear leveling operation. In this case, the memory device 100 may perform the wear leveling operation in response to the command 1. As another example, when the first internal operation is the read reclaim operation, the memory device controller 220 may provide a command for performing the read reclaim operation. In this case, the memory device 100 may perform the read reclaim operation in response to the command 1.

On the other hand, when the GC performing information and the operation request for the garbage collection operation are received from the host controller 210, the memory device controller 220 may provide a command 2 for performing the second internal operation corresponding to the operation request. In this case, the memory device 100 may perform a read operation, a program operation, an erase operation, and the like corresponding to the second internal operation, i.e., the garbage collection operation.

When the mapping relationship between the plurality of zones and the plurality of memory blocks is changed according to a result of the first internal operation or the second internal operation, the memory device controller 220 may provide updated mapping data to the mapping information storage 230.

The mapping information storage 230 may provide the memory device controller 220 with the ZONE information corresponding to the specific memory block on which the first internal operation is to be performed in response to a request of the memory device controller 220.

In addition, the mapping information storage 230 may update the mapping information based on the updated mapping data provided from the memory device controller 220.

The zone management component 310 may determine whether the garbage collection for the target zone is required in response to the GC information request from the host controller 210.

The zone management component 310 may determine whether the garbage collection for the target zone is required based on the ZONE information provided from the host controller 210 and previously stored information related to the plurality of zones. In an embodiment, the zone management component 310 may determine whether the garbage collection for the target zone is required based on whether invalid data is included in the target zone and whether the target zone is an open zone.

When it is determined that the garbage collection for the target zone is required, the zone management component 310 may provide the GC performing information to the host controller 210. In addition, the zone management component 310 may perform the garbage collection operation on the target zone. For example, the zone management component 310 may provide the operation request for performing the garbage collection operation to the host controller 210.

On the other hand, when it is determined that the garbage collection for the target zone is not required, the zone management component 310 may provide the GC unperformed information to the host controller 210.

Therefore, the memory system 10 may check whether to perform the garbage collection on the target zone based on the GC performing or GC unperformed information from the host 300, and determine whether to perform the first internal operation based on a result of checking whether to perform the garbage collection.

Accordingly, according to the embodiments, whether to perform the garbage collection is checked in advance before performing the first internal operation on the specific memory block. Therefore, the performance of memory system 10 may be improved by preventing both of the first internal operation of the storage device 50 and the garbage collection operation of the host 30 from being performed on the specific memory block.

Figure 6:
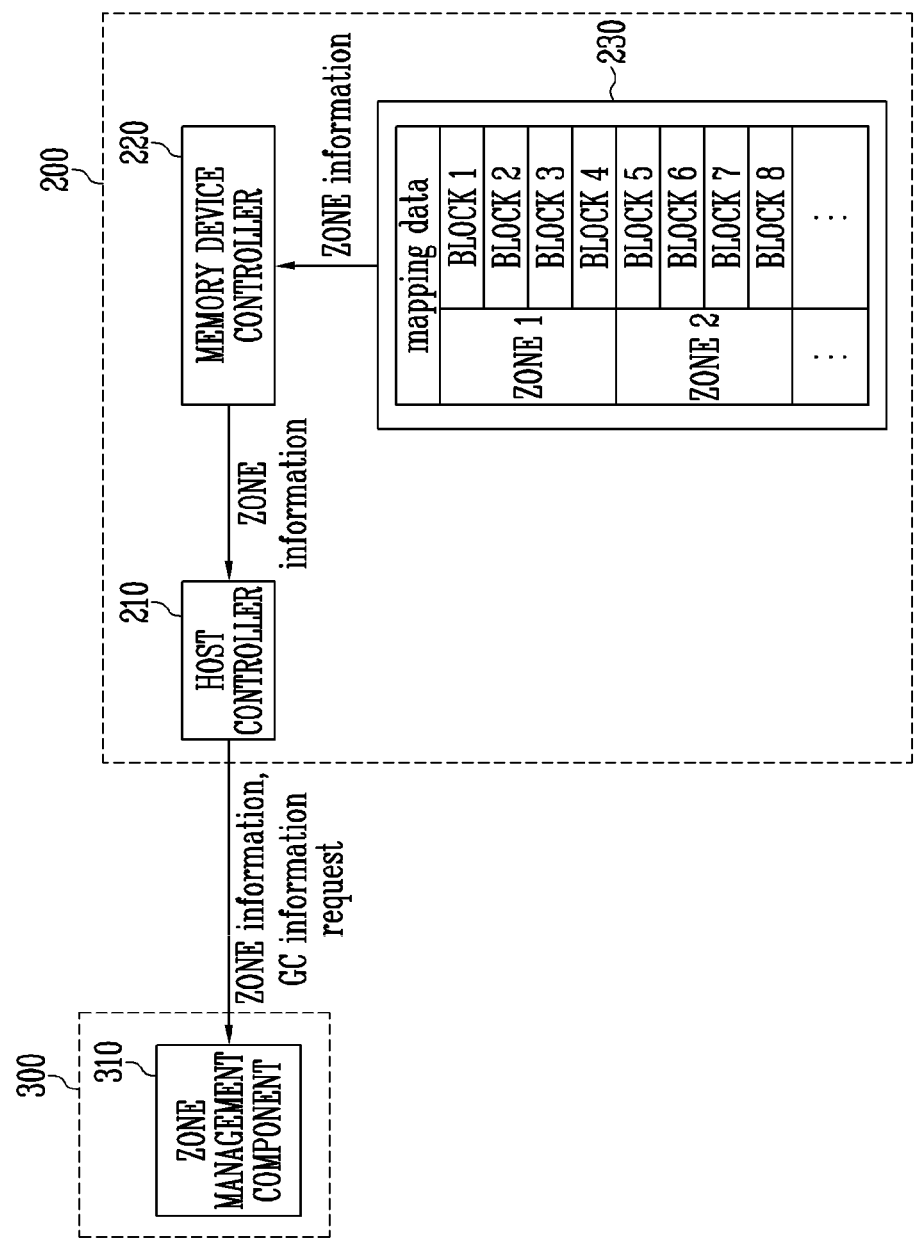
FIG. 6 is a diagram illustrating an operation of requesting information on whether to perform garbage collection according to an embodiment of the present disclosure.

FIG. 6 is a diagram illustrating an operation of requesting information on whether to perform the garbage collection according to an embodiment of the present disclosure. The operation illustrated in FIG. 6 is performed in the memory system 10 shown in FIG. 1.

In FIG. 6, it is assumed that the trigger signal for performing the first internal operation on the specific memory block is generated.

The memory device controller 220 may receive the ZONE information corresponding to the specific memory block on which the first internal operation is to be performed from the mapping information storage 230 according to the trigger signal. In an embodiment, the ZONE information may include identification information on the target zone to which the specific memory block is allocated.

The mapping information storage 230 may check the ZONE information based on mapping information indicating the mapping relationship between the plurality of zones and the plurality of memory blocks, and provide the ZONE information to the memory device controller 220. In an embodiment, the mapping information may include identification information for each zone and identification information for memory blocks allocated to each zone. Referring to FIG. 6, zone includes four memory blocks that are allocated to one zone, but embodiments are not limited thereto, and the number of memory blocks allocated to one zone may be changed according to embodiments.

The memory device controller 220 may provide the ZONE information to the host controller 210.

Thereafter, the host controller 210 may provide the zone management component 310 with the GC information request for information on whether to perform the garbage collection together with the ZONE information.

Figure 7:
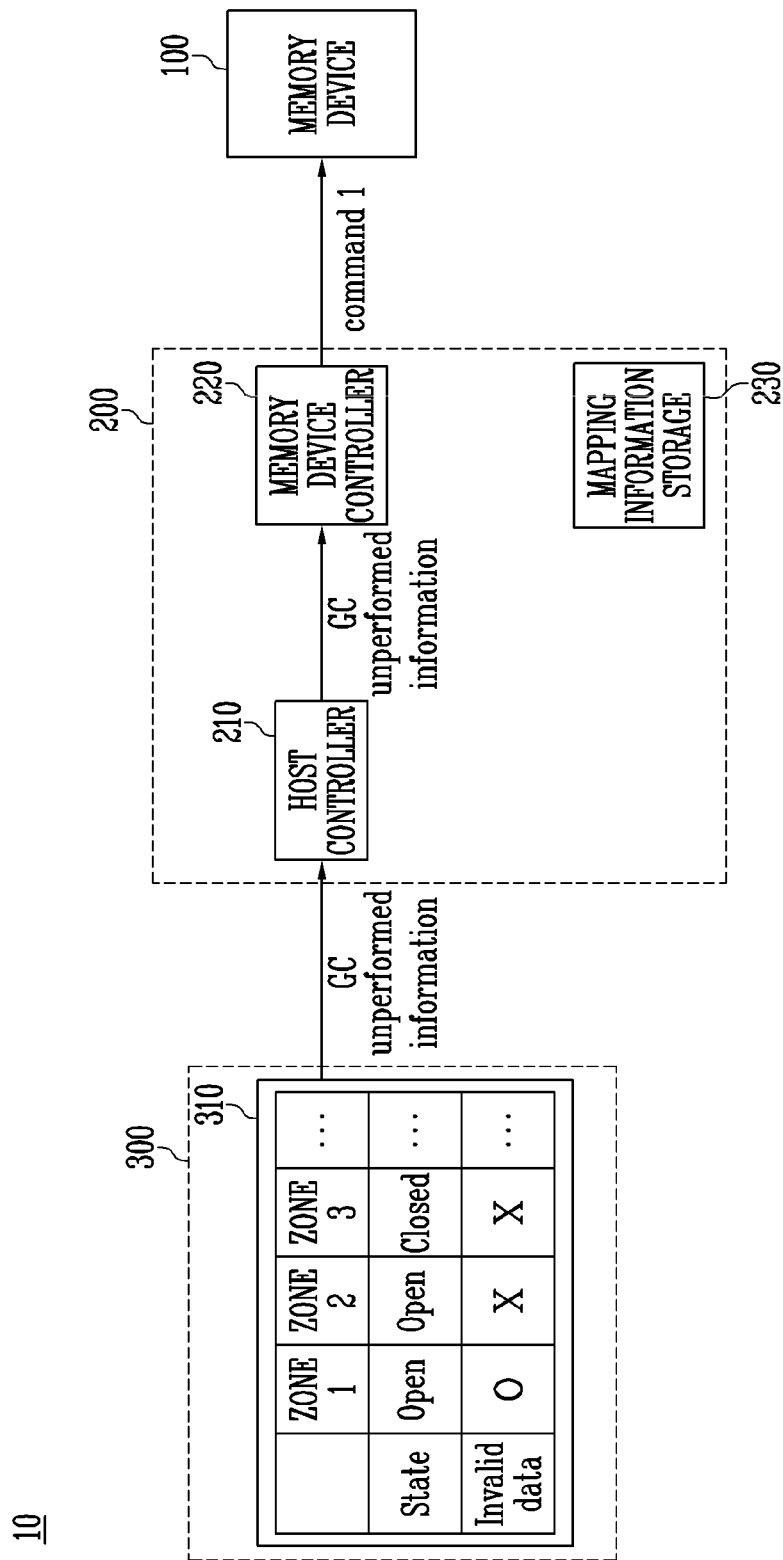
FIG. 7 is a diagram illustrating an example in which information on whether to perform garbage collection is provided according to an embodiment of the present disclosure.

FIG. 7 is a diagram illustrating an example in which information on whether to perform the garbage collection is provided according to an embodiment of the present disclosure. An operation illustrated in FIG. 7 is performed in the memory system 10 shown in FIG. 1.

In FIG. 7, it is assumed that the target zone corresponding to the specific memory block on which the first internal operation is to be performed is the first zone ZONE 1. In addition, it is assumed that the zone management component 310 receives ZONE information on the first zone ZONE 1 and a GC information request for the information on whether to perform the garbage collection on the first zone ZONE 1 from the host controller 210.

The zone management component 310 may determine whether the garbage collection for the first zone ZONE 1 is required based on information related to the plurality of zones stored therein. In an embodiment, the information related to the plurality of zones may include identification information for each of the plurality of zones, state information of each of the plurality of zones, information on whether invalid data is included in each of the plurality of zones, and the like. In FIG. 7, the zone management component 310 stores the identification information, the state information State, and the information on whether the invalid data is included. According to another embodiment, the zone management component 310 may further store information on whether the garbage collection is required for each of the plurality of zones.

In an embodiment, the zone management component 310 may determine whether the garbage collection for the target zone is required based on whether invalid data is included in the target zone and whether the target zone is an open zone or a closed zone.

In an embodiment, when the invalid data is included in the target zone and the target zone is the open zone, the zone management component 310 may determine that the garbage collection for the target zone is not required.

Referring to FIG. 7, since the invalid data is included in the first zone ZONE 1 and the first zone ZONE 1 is in an open state, the zone management component 310 may determine that the garbage collection for the first zone ZONE 1 is not required. In this case, the zone management component 310 may provide the host controller 210 with the GC unperformed information indicating that the garbage collection operation is not to be performed on the first zone ZONE 1.

The host controller 210 may provide the GC unperformed information received from the zone management component 310 to the memory device controller 220.

When the memory device controller 220 receives the GC unperformed information, the memory device controller 220 may control the memory device 100 to perform the first internal operation. For example, the memory device controller 220 may provide the command 1 for performing the first internal operation, such as a command for performing the wear leveling operation or a command for performing the read reclaim operation, to the memory device 100.

Accordingly, in response to the command 1, the memory device 100 may perform the first internal operation on the specific memory block.

Figure 8:
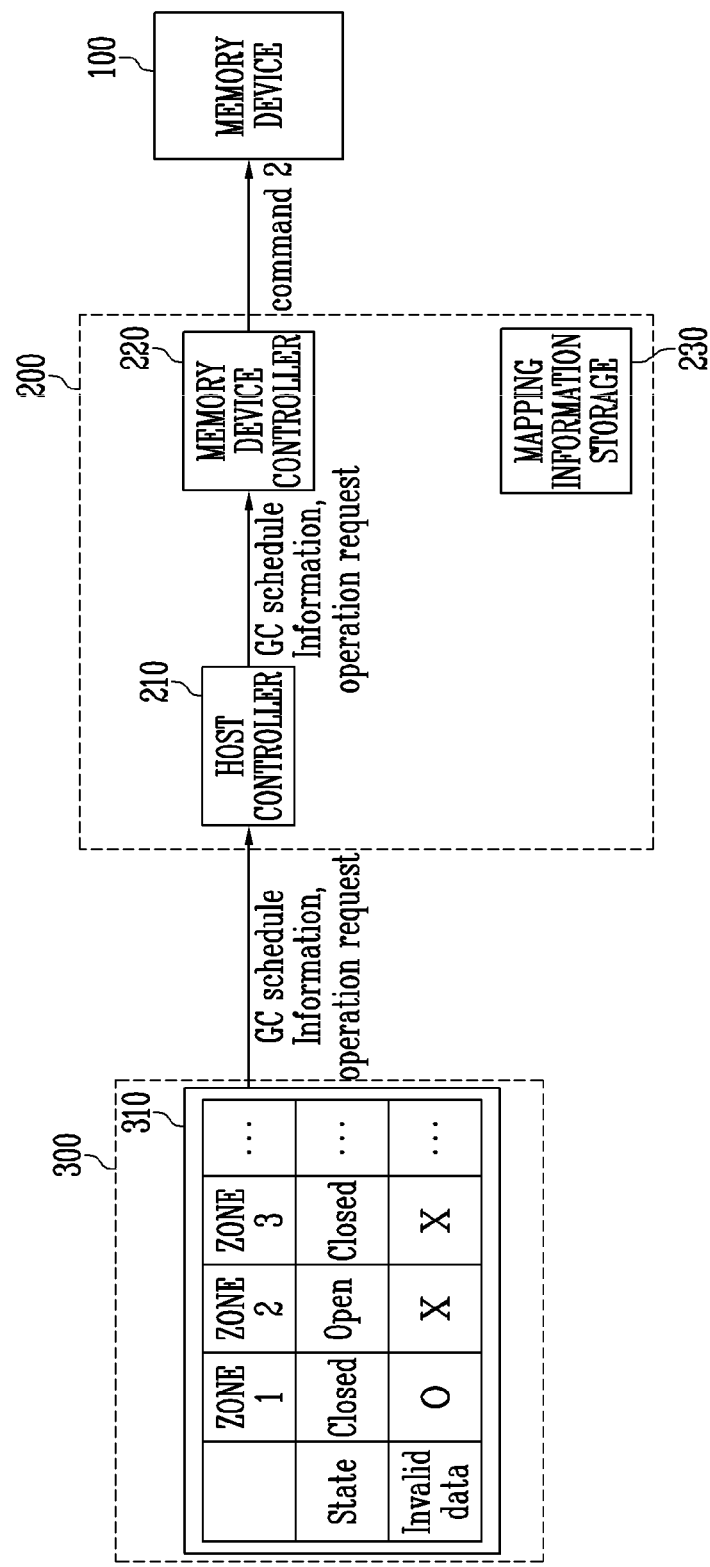
FIG. 8 is a diagram illustrating another example in which information on whether to perform garbage collection is provided according to an embodiment of the present disclosure.

FIG. 8 is a diagram illustrating another example in which information on whether to perform the garbage collection is provided according to an embodiment of the present disclosure. An operation illustrated FIG. 8 is performed in the memory system 10 shown in FIG. 1.

In FIG. 8, it is assumed that a target zone corresponding to a specific memory block on which the first internal operation is to be performed is the first zone ZONE 1. In addition, it is assumed that the zone management component 310 receives ZONE information on the first zone ZONE 1 and a GC information request for information on whether to perform the garbage collection for the first zone ZONE 1 from the host controller 210.

In an embodiment, when invalid data is included in the target zone and the target zone is a closed zone, the zone management component 310 may determine that the garbage collection for the target zone is required.

Referring to FIG. 8, since the invalid data is included in the first zone ZONE 1 and the first zone ZONE 1 is in a closed state, the zone management component 310 may determine that the garbage collection for the first zone ZONE 1 is required. In this case, the zone management component 310 may provide the host controller 210 with GC performing information indicating that a garbage collection operation is to be performed on the first zone ZONE 1.

In addition, the zone management component 310 may provide the GC performing information on the first zone ZONE 1 to the host controller 210, and then control the garbage collection operation. For example, the zone management component 310 may provide the host controller 210 with an operation request for the garbage collection operation.

The host controller 210 may provide the GC performing information provided by the zone management component 310 to the memory device controller 220. In addition, the host controller 210 may provide the operation request to the memory device controller 220.

When the memory device controller 220 receives the GC performing information, the memory device controller 220 may control the memory device 100 to wait until the operation request for the first zone ZONE 1 is received from the host controller 210.

Thereafter, when receiving the operation request from the host controller 210, the memory device controller 220 may control the memory device 100 to perform the second internal operation on the memory blocks allocated to the first zone ZONE 1. For example, the memory device controller 220 may provide a command 2 for performing the second internal operation to the memory device 100. The second internal operation is the garbage collection operation.

Accordingly, the memory device 100 may perform the second internal operation, i.e., the garbage collection operation, on the memory blocks allocated to the first zone ZONE 1.

Figure 9:
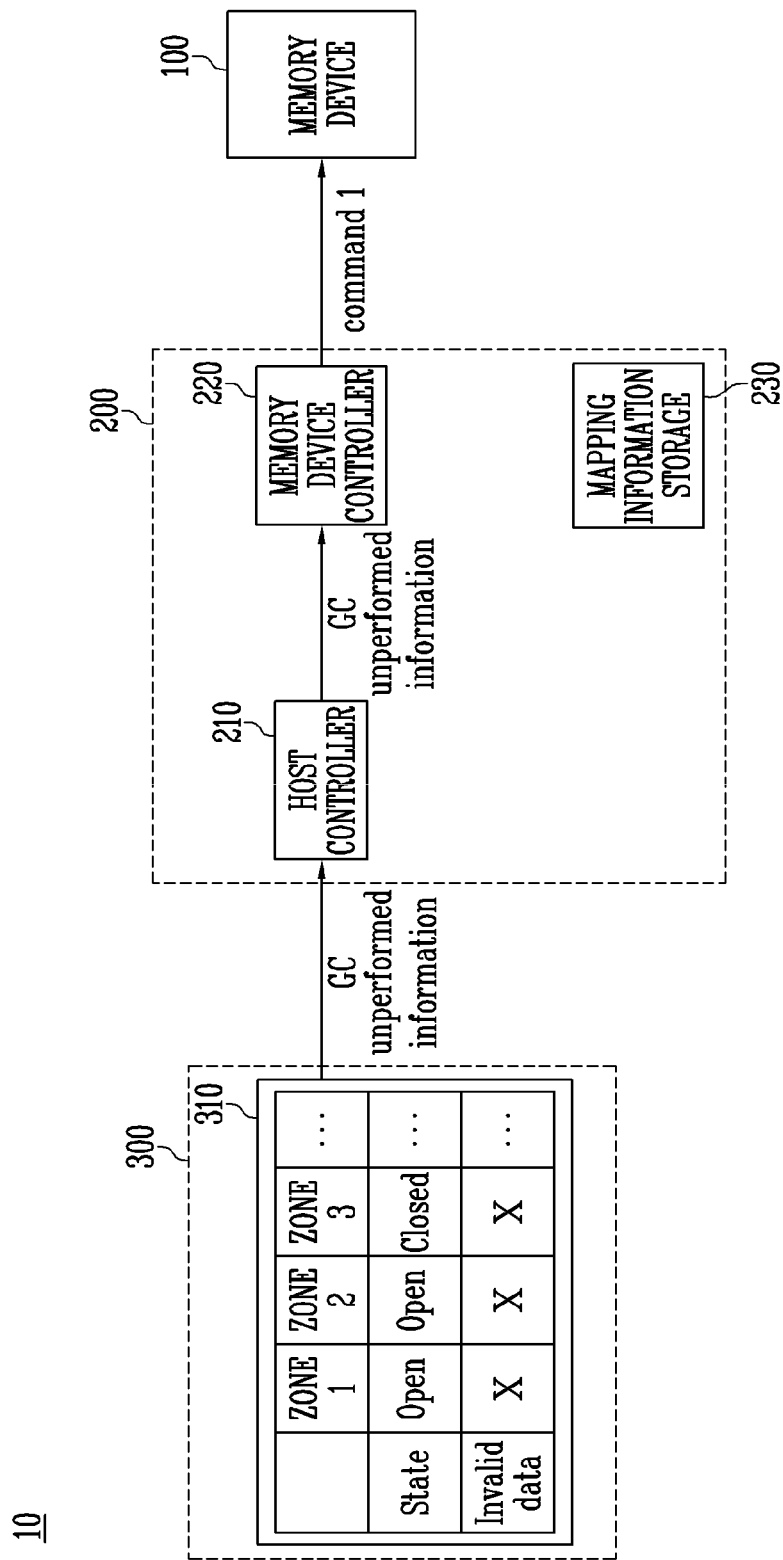
FIG. 9 is a diagram illustrating still another example in which information on whether to perform garbage collection is provided according to an embodiment of the present disclosure.

FIG. 9 is a diagram illustrating still another example in which information on whether to perform the garbage collection is provided according to an embodiment of the present disclosure. An operation illustrated FIG. 9 is performed in the memory system 10 shown in FIG. 1.

In FIG. 9, it is assumed that a target zone corresponding to a specific memory block on which the first internal operation is to be performed is the first zone ZONE 1. In addition, it is assumed that the zone management component 310 receives ZONE information on the first zone ZONE 1 and a GC information request for information on whether to perform the garbage collection for the first zone ZONE 1 from the host controller 210.

In an embodiment, when invalid data is not included in the target zone, the zone management component 310 may determine that the garbage collection for the target zone is not required.

Referring to FIG. 9, since the first zone ZONE 1 does not include the invalid data, the zone management component 310 may determine that the garbage collection for the first zone ZONE 1 is not required. In this case, the zone management component 310 may provide GC unperformed information on the first zone ZONE 1 to the host controller 210.

The host controller 210 may provide the GC unperformed information provided by the zone management component 310 to the memory device controller 220.

When the memory device controller 220 receives the GC unperformed information, the memory device controller 220 may control the memory device 100 to perform the first internal operation. For example, the memory device controller 220 may provide the command 1 for performing the first internal operation, such as the command for performing the wear leveling operation or the command for performing the read reclaim operation, to the memory device 100.

Accordingly, the memory device 100 may perform the first internal operation on the specific memory block.

Figure 10:
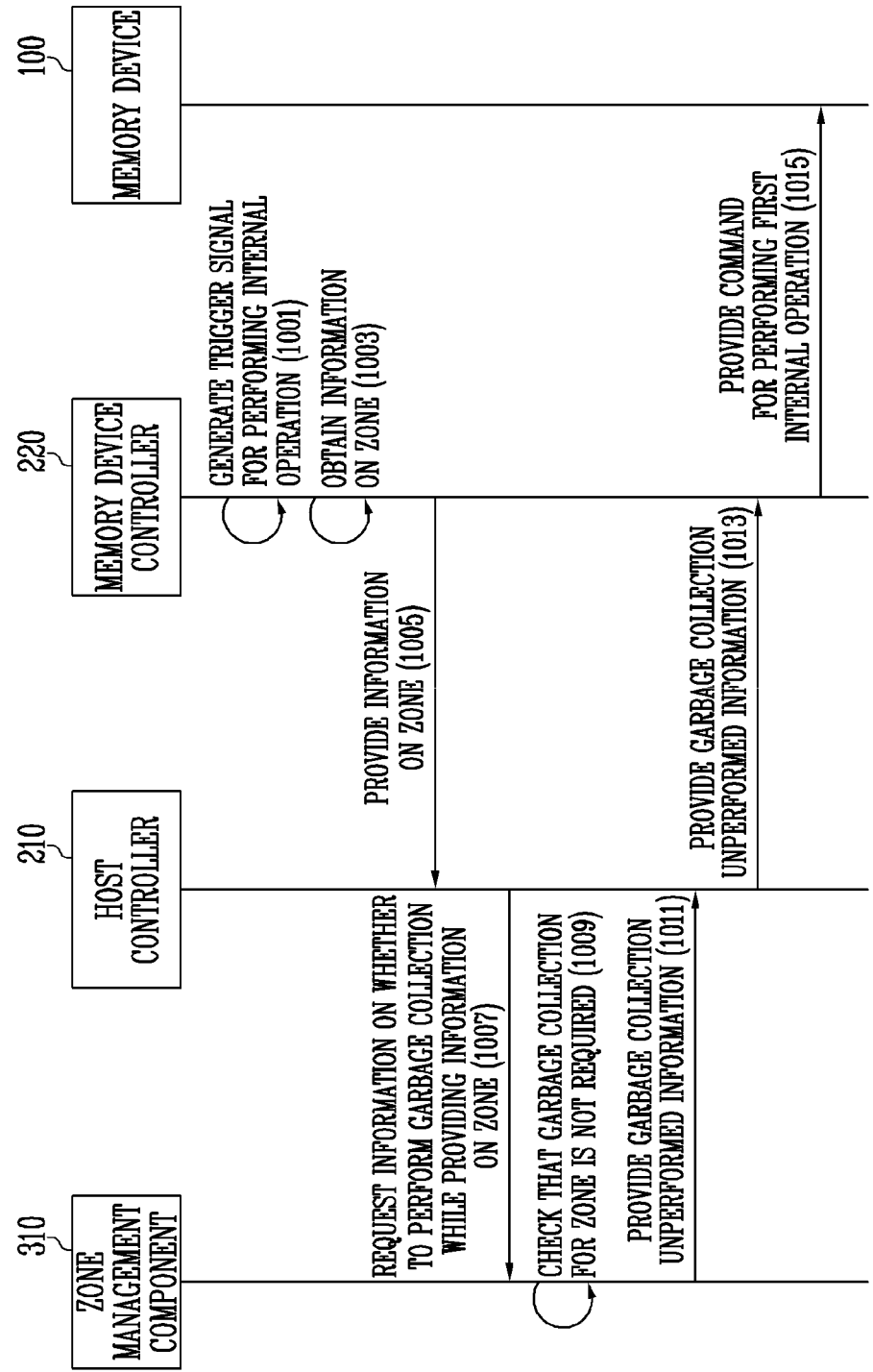
FIG. 10 is a diagram illustrating a process of performing a first internal operation according to an embodiment of the present disclosure.

FIG. 10 is a diagram illustrating a process of performing the first internal operation according to an embodiment of the present disclosure. The first internal operation may be the wear leveling operation or the read reclaim operation.

Specifically, the diagram shown in FIG. 10 may illustrate the process of performing the first internal operation by checking information on whether to perform the garbage collection for a target zone.

A memory device 100, a host controller 210, a memory device controller 220, and a zone management component 310 shown in FIG. 10 may correspond to the memory device 100, the host controller 210, the memory device controller 220, and the zone management component 310 shown in each of FIGS. 1 and 5, respectively.

The memory device controller 220 may generate a trigger signal for performing the first internal operation (1001).

Thereafter, the memory device controller 220 may obtain ZONE information on the target zone from the mapping information storage 230 in response to the trigger signal (1003).

Thereafter, the memory device controller 220 may provide the ZONE information on the target zone to the host controller 210 (1005).

Thereafter, the host controller 210 may request information on whether to perform the garbage collection for the target zone while providing the ZONE information on the target zone to the zone management component 310 (1007).

Thereafter, the zone management component 310 may check that the garbage collection for the target zone is not required (1009).

For example, when invalid data is included in the target zone and the target zone is an open zone, the zone management component 310 may determine that the garbage collection for the target zone is not required.

In addition, when the invalid data is not included in the target zone, the zone management component 310 may determine that the garbage collection for the target zone is not required.

Thereafter, the zone management component 310 may provide GC unperformed information to the host controller 210 (1011).

Thereafter, the host controller 210 may provide the GC unperformed information to the memory device controller 220 (1013).

Thereafter, the memory device controller 220 may provide a command for performing the first internal operation to the memory device 100 (1015).

Figure 11:
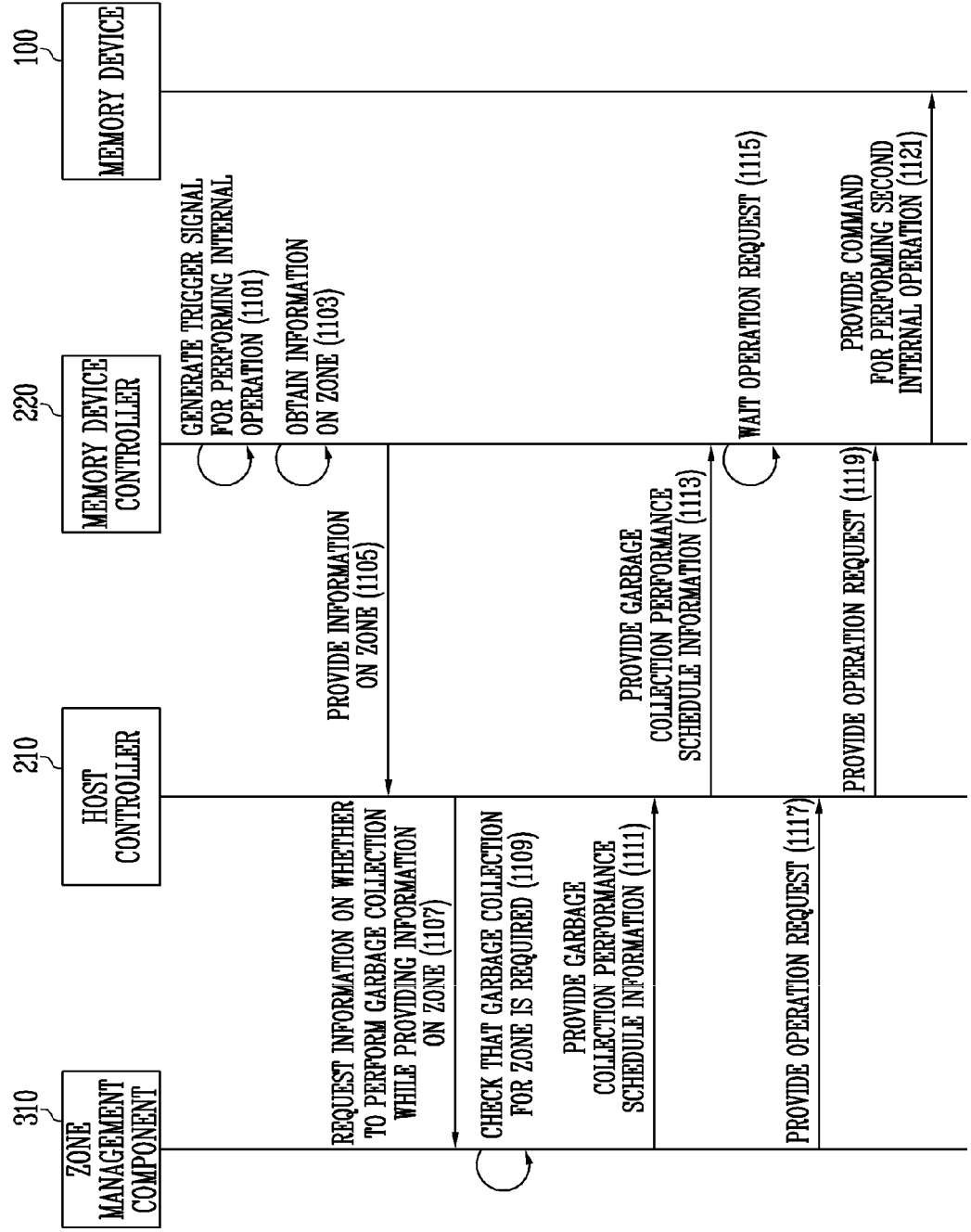
FIG. 11 is a diagram illustrating a process of performing a second internal operation according to an embodiment of the present disclosure.

FIG. 11 is a diagram illustrating a process of performing the second internal operation according to an embodiment of the present disclosure. The second internal operation may be the garbage collection operation.

Specifically, the diagram shown in FIG. 11 may illustrate the process of performing the second internal operation by checking information on whether to perform the garbage collection for a target zone.

A memory device 100, a host controller 210, a memory device controller 220, and a zone management component 310 shown in FIG. 11 may correspond to the memory device 100, the host controller 210, the memory device controller 220, and the zone management component 310 shown in each of FIGS. 1 and 5, respectively.

The memory device controller 220 may generate a trigger signal for performing the first internal operation (1101).

Thereafter, the memory device controller 220 may obtain ZONE information on the target zone from the mapping information storage 230 in response to the trigger signal (1103).

Thereafter, the memory device controller 220 may provide the ZONE information on the target zone to the host controller 210 (1105).

Thereafter, the host controller 210 may request information on whether to perform the garbage collection for the target zone while providing the ZONE information on the target zone to the zone management component 310 (1107).

Thereafter, the zone management component 310 may check that the garbage collection for the target zone is required (1109).

For example, when invalid data is included in the target zone and the target zone is a closed zone, the zone management component 310 may determine that the garbage collection for the target zone is required.

Thereafter, the zone management component 310 may provide GC performing information to the host controller 210 (1111).

Thereafter, the host controller 210 may provide the GC performing information to the memory device controller 220 (1113).

Thereafter, the memory device controller 210 may wait until an operation request corresponding to the garbage collection operation controlled by the zone management component 310 is received (1115)).

Thereafter, the zone management component 310 may provide the operation request corresponding to the garbage collection operation to the host controller 210 (1117).

Thereafter, the host controller 210 may provide the operation request to the memory device controller 220 (1119).

Thereafter, the memory device controller 220 may provide the memory device 100 with a command for performing the second internal operation in response to the operation request (1121).

Figure 12:
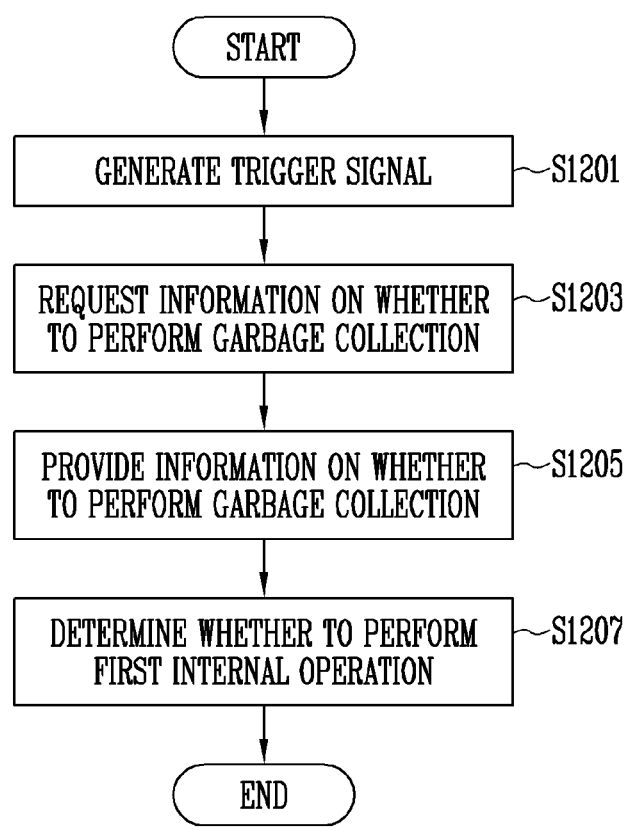
FIG. 12 is a flowchart illustrating a method of operating a memory system according to an embodiment of the present disclosure.

FIG. 12 is a flowchart illustrating a method of operating a memory system according to an embodiment of the present disclosure.

For example, the method shown in FIG. 12 may be performed by the memory system 10 shown in each of FIGS. 1 and 5.

In step S1201, the memory system 10, e.g., the memory controller 200, may generate the trigger signal for performing the first internal operation.

In step S1203, the memory system 10, e.g., the memory controller 200, may request the information on whether to perform the garbage collection for the target zone corresponding to the specific memory block on which the first internal operation is to be performed among the plurality of zones, according to the trigger signal.

At this time, the memory system 10, e.g., the memory controller 200, may obtain the ZONE information on the target zone based on the mapping information indicating the mapping relationship between the plurality of zones and the plurality of memory blocks.

In addition, the memory system 10, e.g., the memory controller 200, may request the information on whether to perform the garbage collection for the target zone while providing the ZONE information on the target zone to the host 300.

In step S1205, the memory system 10, e.g., the host 300, may provide the information on whether to perform the garbage collection for the target zone to the memory controller 200 based on information related to the plurality of zones stored in the host 300.

At this time, the memory system 10, e.g., the host 300, may determine whether invalid data is included in the target zone based on the ZONE information on the target zone and the information related to the plurality of zones.

In addition, the memory system 10, e.g., the host 300, may provide one of the GC performing information and the GC unperformed information to the memory controller 200 according to whether the invalid data is included in the target zone and whether the target zone is an open zone.

In step S1207, the memory system 10, e.g., the memory controller 200, may determine whether to perform the first internal operation, i.e., the wear leveling operation or the read reclaim operation, based on the GC information on whether to perform the garbage collection.

Figure 13:
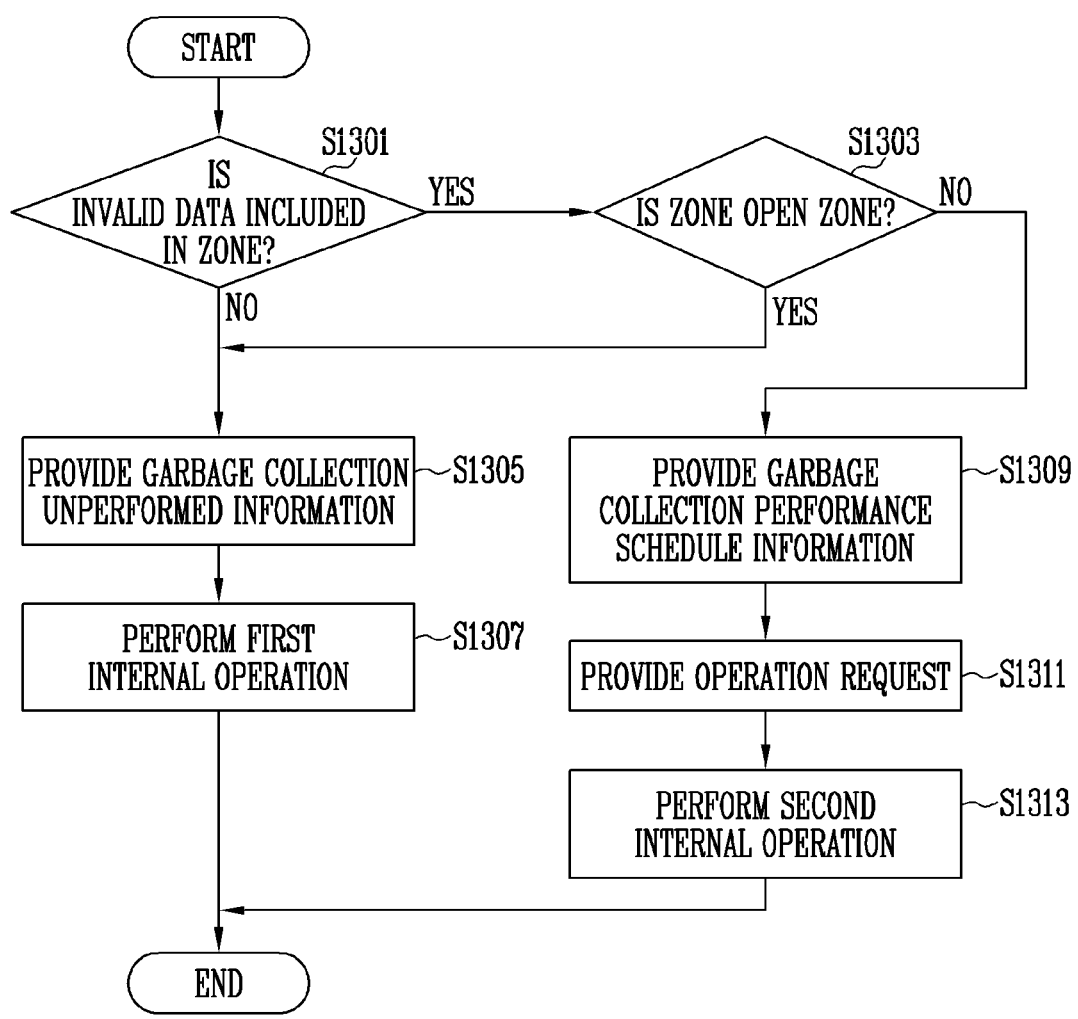
FIG. 13 is a flowchart illustrating a method of determining whether to perform a first internal operation or a second internal operation according to an embodiment of the present disclosure.

FIG. 13 is a flowchart illustrating a method of determining whether to perform the first internal operation or the second internal operation according to an embodiment of the present disclosure.

For example, the method shown in FIG. 13 may be performed by the memory system 10 shown in each of FIGS. 1 and 5.

In step S1301, the memory system 10, e.g., the host 300, may determine whether invalid data is included in a target zone based on ZONE information on the target zone and information related to the plurality of zones.

When the invalid data is included in the target zone according to a determination result in step S1301, in step S1303, the memory system 10 may determine whether the target zone is an open zone based on the ZONE information on the target zone and the information related to the plurality of zones.

When the invalid data is not included in the target zone according to the determination result in step S1301 or when the target zone is the open zone according to a determination result in step S1303, in step S1305, the memory system 10, e.g., the host 300, may provide the GC unperformed information to the memory controller 200.

In step S1307, the memory system 10, e.g., the memory controller 200, may perform the first internal operation according to the GC unperformed information.

When the target zone is not the open zone according to the determination result in step S1303, in step S1309, the memory system 10, e.g., the host 300, may provide the GC performing information to the memory controller 200.

In step S1311, the memory system 10, e.g., the host 300, may provide the operation request for the garbage collection operation on the target zone to the memory controller 200.

In step S1313, the memory system 10, e.g., the memory controller 200, may perform the second internal operation on memory blocks included in the target zone according to the operation request.

Figure 14:
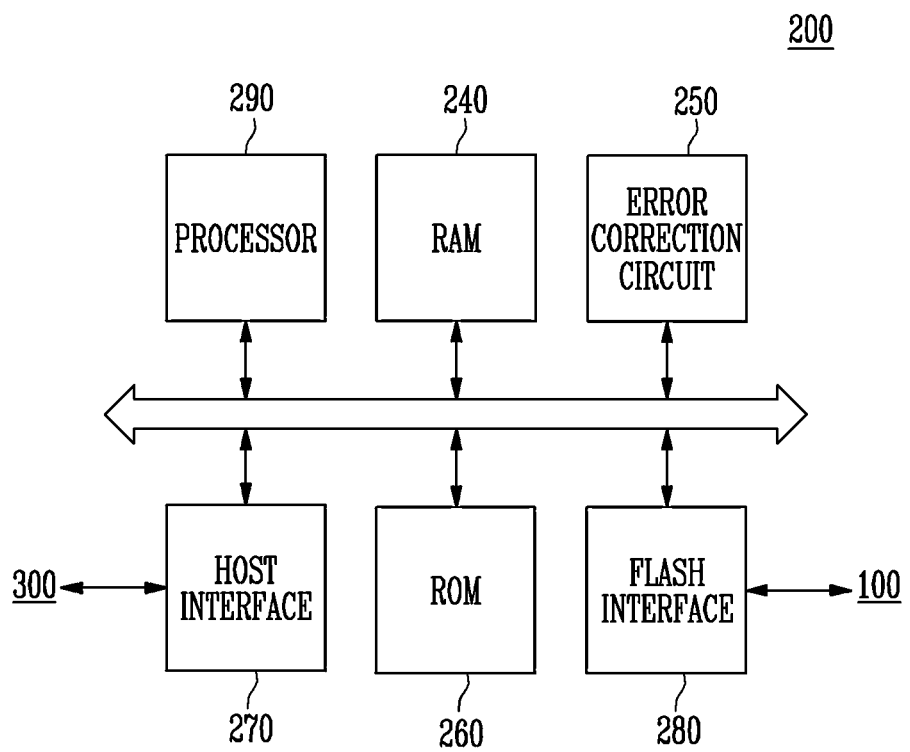
FIG. 14 is a diagram illustrating a memory controller of FIG. 1.

FIG. 14 is a diagram illustrating the memory controller 200 of FIG. 1.

Referring to FIGS. 1 and 14, the memory controller 200 may include a processor 290, a RAM 240, an error correction circuit 250, a ROM 260, a host interface 270, and a flash interface 280.

The processor 290 may control an overall operation of the memory controller 200. The RAM 240 may be used as a buffer memory, a cache memory, an operation memory, and the like of the memory controller 200.

The error correction circuit 250 may perform error correction. The error correction circuit 250 may perform error correction encoding (ECC encoding) based on data to be written to the memory device 100 through the flash interface 280. The error correction encoded data may be transferred to the memory device 100 through the flash interface 280. The error correction circuit 250 may perform error correction decoding (ECC decoding) on data received from the memory device 100 through the flash interface 280. In another embodiment, the error correction circuit 250 may be included in the flash interface 280 as a component of the flash interface 280.

The ROM 260 may store various information required for the memory controller 200 to operate in a firmware form. In an embodiment, the host controller 210, the memory device controller 220, and the mapping information storage 230 of FIG. 1 may be firmware stored in the ROM 260.

The memory controller 200 may communicate with an external device (for example, the host 300, an application processor, and the like) through the host interface 270. In an embodiment, the host controller 210 of FIG. 1 may control the host interface 270.

The memory controller 200 may communicate with the memory device 100 through the flash interface 280. In an embodiment, the memory device controller 220 of FIG. 1 may control the flash interface 280. The memory controller 200 may transmit a command CMD, an address ADDR, a control signal CTRL, and the like to the memory device 100 and receive data DATA through the flash interface 280. For example, the flash interface 280 may include a NAND interface.

Figure 15:
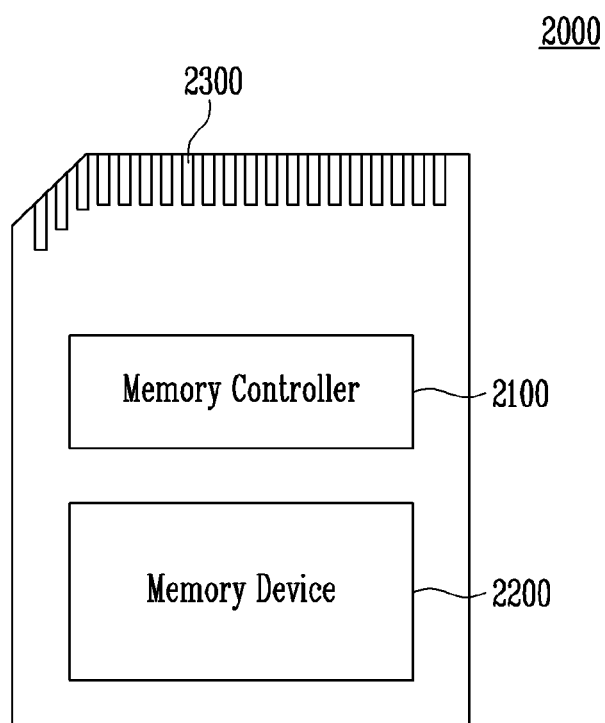
FIG. 15 is a block diagram illustrating a memory card system according to an embodiment of the present disclosure.

FIG. 15 is a block diagram illustrating a memory card system 2000 according to an embodiment of the present disclosure.

Referring to FIG. 15, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and an external device. The memory controller 2100 is configured to drive firmware for controlling the memory device 2200. The memory controller 2100 may be implemented equally to the memory controller 200 described with reference to FIG. 1. The memory device 2200 may be implemented identically to the memory device 100 described with reference to FIG. 2.

For example, the memory controller 2100 may include one or more of components such as a random access memory (RAM), a processor, a host interface, a memory interface, and an error corrector.

The memory controller 2100 may communicate with an external device through the connector 2300. The memory controller 2100 may communicate with the external device (for example, the host 300 of FIG. 1) according to a specific communication standard. For example, the memory controller 2100 is configured to communicate with the external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, an NVMe, and so on. For example, the connector 2300 may be defined by at least one of the various communication standards described above.

For example, the memory device 2200 may be configured of one or more of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), a spin transfer torque magnetic RAM (STT-MRAM), and so on.

The memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMC-micro, or eMMC), an SD card (SD, miniSD, microSD, or SDHC), a universal flash storage (UFS), or the like.

Figure 16:
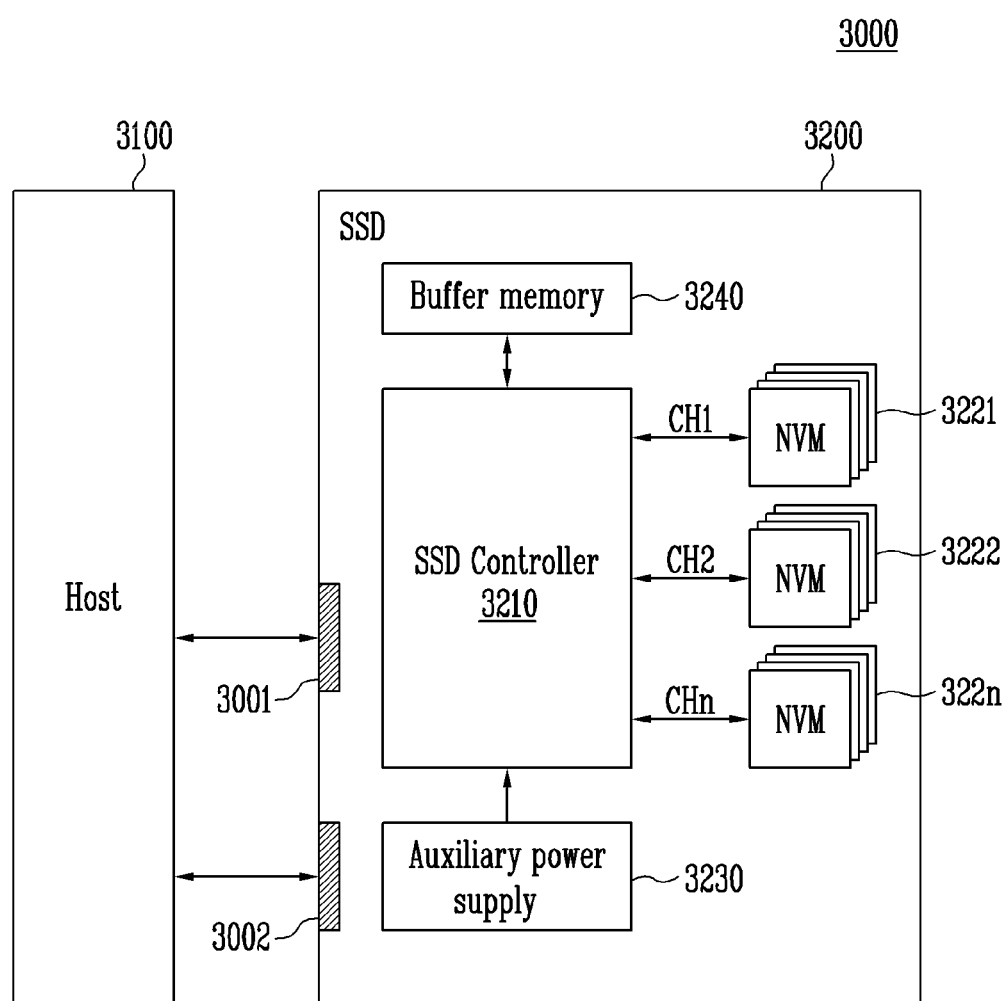
FIG. 16 is a block diagram illustrating a solid state drive (SSD) system according to an embodiment of the present disclosure.

FIG. 16 is a block diagram illustrating a solid state drive (SSD) system 3000 according to an embodiment of the present disclosure.

Referring to FIG. 16, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal SIG received from the host 3100. For example, the signal SIG may include signals based on an interface between the host 3100 and the SSD 3200. For example, the signal SIG may include a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, an NVMe, and so on.

The auxiliary power supply 3230 is connected to the host 3100 through the power connector 3002. The auxiliary power supply 3230 may receive the power PWR from the host 3100. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, a GRAM, or the like, or a nonvolatile memory such as an FRAM, a ReRAM, an STT-MRAM, a PRAM, or the like.

Figure 17:
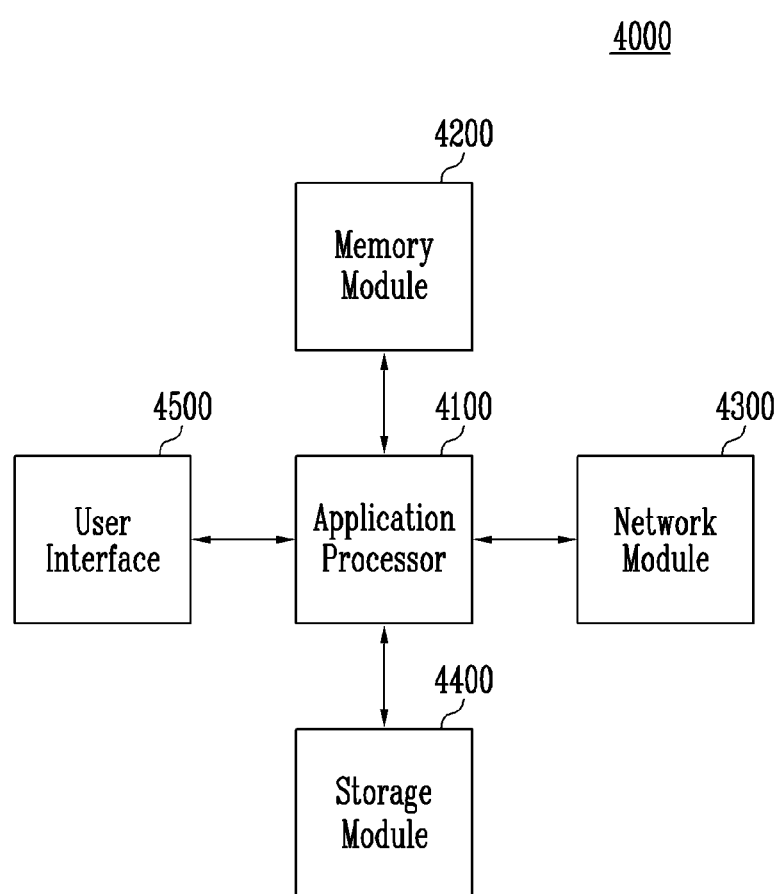
FIG. 17 is a block diagram illustrating a user system according to an embodiment of the present disclosure.

FIG. 17 is a block diagram illustrating a user system 4000 according to an embodiment of the present disclosure.

Referring to FIG. 17, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile memory such as a DRAM, an SDRAM, a DDR SDRAM, a DDR2 SDRAM, a DDR3 SDRAM, an LPDDR SDARM, an LPDDR2 SDRAM, an LPDDR3 SDRAM, or the like, or a nonvolatile memory such as a PRAM, a ReRAM, an MRAM, an FRAM, or the like. For example, the application processor 4100 and the memory module 4200 may be packaged based on a package on package (POP) and provided as one semiconductor package.

The network module 4300 may communicate with external devices. For example, the network module 4300 may support wireless communications such as code division multiple access (CDMA), global system for mobile communications (GSM), wideband CDMA (WCDMA), CDMA-2000, time division multiple access (TDMA), long term evolution, Wimax, WLAN, UWB, Bluetooth, Wi-Fi, or the like. In an embodiment, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a nonvolatile semiconductor memory element such as a phase-change RAM (PRAM), a magnetic RAM (MRAM), a resistive RAM (RRAM), a NAND flash, a NOR flash, a three-dimensional NAND flash, or the like. For example, the storage module 4400 may be provided as a removable storage device (or removable drive), such as a memory card, or an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include one or more of user input interfaces such as a keyboard, a keypad, a button, a touch panel, a touch screen, a touch pad, a touch ball, a camera, a microphone, a gyroscope sensor, a vibration sensor, a piezoelectric element, and so on. The user interface 4500 may further include one or more of user output interfaces such as a liquid crystal display (LCD), an organic light emitting diode (OLED) display device, an active matrix OLED (AMOLED) display device, an LED, a speaker, a monitor, and so on.

What is claimed is:

1. A memory system, comprising:
a storage device including a memory device that includes a plurality of memory blocks allocated to a plurality of zones;
a memory controller that is configured to communicate with a host using a host interface and send, to the host, a request for information on whether to perform a garbage collection operation on a target zone through the host interface, in response to a trigger signal for performing a first internal operation, the target zone corresponding to a target memory block on which the first internal operation is to be performed, the target zone being included in the plurality of zones; and
the host configured to control the storage device and provide first information indicating that the garbage collection operation is to be performed on the target zone to the memory controller based on information related to the plurality of zones, in response to the request,
wherein when the memory controller receives an operation request for performing the garbage collection operation on the target zone controlled by the host from the host through the host interface, the memory controller controls the memory device to perform a second internal operation corresponding to the garbage collection operation.

2. The memory system of claim 1, wherein each of the plurality of zones corresponds to an area that stores data corresponding to a plurality of successive logical addresses provided by the host.

3. The memory system of claim 1, wherein the memory controller stores mapping information indicating a mapping relationship between the plurality of zones and the plurality of memory blocks, obtains zone information on the target zone based on the mapping information, and requests the information on whether to perform the garbage collection operation while providing the zone information on the target zone to the host through the host interface.

4. The memory system of claim 1, wherein the information related to the plurality of zones includes identification information of each of the plurality of zones, state information of each of the plurality of zones, and information on whether invalid data is included in each of the plurality of zones.

5. The memory system of claim 1, wherein when invalid data is included in the target zone and the target zone is not an open zone that is a writable zone, the host provides the first information to the memory controller and controls the garbage collection operation on the target zone.

6. The memory system of claim 1, wherein when the memory controller receives the first information from the host through the host interface, the memory controller controls the memory device to wait until the operation request is received from the host.

7. A method of operating a memory system including a storage device and a host controlling the storage device, the method comprising:
generating, by a memory controller of the storage device, a trigger signal for performing a first internal operation;
sending, by the memory controller, a request for information on whether to perform a garbage collection operation on a target zone through a host interface, in response to the trigger signal, to the host, the target zone corresponding to a target memory block on which the first internal operation is to be performed, the target zone being included in a plurality of zones;
providing, by the host, first information indicating that the garbage collection operation is to be performed on the target zone to the memory controller based on information related to the plurality of zones, which is stored in the host;
providing, by the host, an operation request for performing the garbage collection operation on the target zone controlled by the host to the memory controller; and
controlling, by the memory controller, a memory device of the storage device to perform a second internal operation corresponding to the garbage collection operation according to the operation request.

8. The method of claim 7, wherein sending the request comprises:
obtaining zone information on the target zone based on mapping information indicating a mapping relationship between the plurality of zones and a plurality of memory blocks allocated to the plurality of zones; and
requesting the information on whether to perform the garbage collection operation while providing the zone information on the target zone to the host through the host interface.

9. The method of claim 7, wherein providing the first information comprises providing the first information when invalid data is included in the target zone and the target zone is not an open zone that is a writable zone.

10. A memory controller that controls a memory device including a plurality of memory blocks allocated to a plurality of zones, the memory controller comprising:
a host controller configured to communicate with a host using a host interface, send, to the host, a request for information on whether to perform a garbage collection operation on a target zone through the host interface, in response to a trigger signal for performing a first internal operation, the target zone corresponding to a target memory block on which the first internal operation is to be performed, the target zone being included in the plurality of zones, and receive, from the host, first information indicating that the garbage collection operation managed by the host is to be performed on the target zone through the host interface; and a memory device controller configured to control, when the host controller receives an operation request for performing the garbage collection operation managed by the host on the target zone from the host through the host interface, the memory device to perform a second internal operation corresponding to the garbage collection operation on the target zone controlled by the host.

11. The memory controller of claim 10, further comprising:

a mapping information storage configured to store mapping information indicating a mapping relationship between the plurality of zones and the plurality of memory blocks, wherein each of the plurality of zones corresponds to an area that stores data corresponding to a plurality of successive logical addresses provided by the host.

* * * * *